US010435016B2

(12) United States Patent
Watanabe et al.

(10) Patent No.: US 10,435,016 B2
(45) Date of Patent: Oct. 8, 2019

(54) SYSTEM AND METHOD TO STABILIZE MOTORCYCLES

(71) Applicant: Mechanical Simulation Corporation, Ann Arbor, MI (US)

(72) Inventors: Yukio Watanabe, Ann Arbor, MI (US); Michael Sayers, Ann Arbor, MI (US)

(73) Assignee: Mechanical Simulation Corporation, Ann Arbor, MI (US)

( * ) Notice: Subject to any disclaimer, the term of this patent is extended or adjusted under 35 U.S.C. 154(b) by 0 days.

(21) Appl. No.: 15/592,650

(22) Filed: May 11, 2017

(65) Prior Publication Data
US 2017/0327109 A1 Nov. 16, 2017

Related U.S. Application Data

(60) Provisional application No. 62/336,702, filed on May 15, 2016, provisional application No. 62/344,733, filed on Jun. 2, 2016.

(51) Int. Cl.
*B60W 30/04* (2006.01)
*B60W 10/06* (2006.01)
(Continued)

(52) U.S. Cl.
CPC ............ *B60W 30/04* (2013.01); *B60W 10/06* (2013.01); *B60W 10/18* (2013.01); *B60W 10/20* (2013.01);
(Continued)

(58) Field of Classification Search
CPC ........ B62K 11/007; B62K 11/04; B62K 1/00; B62K 21/00; B62K 2207/02; B60G 2300/12; B60L 2200/16; B60L 2260/34
(Continued)

(56) References Cited

U.S. PATENT DOCUMENTS 6,108,599 A 8/2000 Yamamoto et al.
2005/0197994 A1 9/2005 Fujii et al.
(Continued)

OTHER PUBLICATIONS

The International Search Report and Written Opinion of the International Searching Authority for PCT/US2017/32132, date completed Jul. 24, 2017, dated Aug. 11, 2017.
(Continued)

*Primary Examiner* — Nga X Nguyen
(74) *Attorney, Agent, or Firm* — Miller Canfield Paddock and Stone; Mark L Maki

(57) ABSTRACT

Motorcycles can become unstable when operating at high speeds and at high cornering levels. For example, they can exhibit an oscillation at the rear wheel commonly known as "weave." A system and method is provided which utilizes a high-fidelity computer simulation model of a 2- or 3-wheel motorcycle to predict operating states such as yaw rate, lateral acceleration and roll angle for a stable motorcycle at a given speed and steer angle. The operating state of a physical motorcycle can be measured and compared to that of the model at every instant in time to determine if the operating state of the physical motorcycle differs from that of the simulation model in such a way as to indicate loss of stability. The nature of that difference can then be used to intervene in the operation of the motorcycle independent of driver actions by application of brakes, modulating the engine torque or applying torques to urge the steering system in a corrective direction. Thus by comparing the physical response of the motorcycle to that of the computer model in an on-board controller these interventions can be applied at a time and intensity to stabilize the motorcycle and prevent a loss of control.

23 Claims, 19 Drawing Sheets

(51) Int. Cl.
*B60W 10/18* (2012.01)
*B60W 10/20* (2006.01)
*B62J 99/00* (2009.01)
*B62L 3/08* (2006.01)
*F02B 61/02* (2006.01)

(52) U.S. Cl.
CPC ................ *B62J 99/00* (2013.01); *B62L 3/08* (2013.01); *F02B 61/02* (2013.01); *B60W 2030/043* (2013.01); *B60W 2510/0604* (2013.01); *B60W 2510/182* (2013.01); *B60W 2520/125* (2013.01); *B60W 2520/14* (2013.01); *B60W 2520/18* (2013.01); *B60W 2520/28* (2013.01); *B60W 2540/18* (2013.01); *B60W 2710/0666* (2013.01); *B60W 2710/182* (2013.01); *B60W 2710/202* (2013.01); *B62J 2099/002* (2013.01); *B62J 2099/0013* (2013.01)

(58) Field of Classification Search
USPC .............................................. 701/23, 38, 42
See application file for complete search history.

(56) References Cited

U.S. PATENT DOCUMENTS

| | | |
|---|---|---|
| 2006/0204347 A1 | 9/2006 | Waldbauer et al. |
| 2009/0234552 A1* | 9/2009 | Takeda .................. B60W 30/16 701/96 |
| 2010/0299028 A1 | 11/2010 | Savaresi et al. |
| 2010/0324780 A1 | 12/2010 | Koumura et al. |
| 2011/0264300 A1 | 10/2011 | Tuononen |
| 2012/0298437 A1 | 11/2012 | Dietz |
| 2013/0090828 A1 | 4/2013 | Lemejda |
| 2014/0118855 A1 | 5/2014 | Whinnery et al. |
| 2014/0129088 A1 | 5/2014 | Meissner et al. |
| 2014/0236425 A1 | 8/2014 | Savaresi et al. |
| 2014/0277895 A1* | 9/2014 | Shankwitz ........... G05D 1/0891 701/23 |
| 2015/0314781 A1 | 11/2015 | Klews et al. |
| 2016/0129737 A1 | 5/2016 | Singh et al. |

OTHER PUBLICATIONS

Carney, Dan; "Stability Control Boosts Motorcycle Safety," SAE International web article #14090, http://articles.sae.org dated Jun. 5, 2015. (2 pgs).

Lich, Thomas, et al.; "Motorcycle Stability Control—The Next Generation of Motorcycle Safety and Riding Dynamics," SAE International J. Engines 9(1), 2016. (8 pgs).

Sharp, R.D. and Watanabe, Y.; "Chatter Vibrations of High-Performance Motorcycles," Vehicle System Dynamics, 2012 (13 pgs).

van Zanten, A.T.; "Bosch ESP Systems: 5 Years of Experience," SAE Technical Paper Series, SAE Automotive Dynamics & Stability Conference, May 15-17, 2000. (11 pgs).

* cited by examiner

Figure 1. Yaw rates (actual and predicted) and applied brake pressures and animated comparison between with and without stability control under 145km/h speed on a 50% low-friction cornering.

Figure 2. BikeSim-Linear models (with and without ESC) root locus for small perturbations from steady turning motions on a 50% low-friction surface with variation in speed (30-200km/h).

SYSTEM AND METHOD TO STABILIZE MOTORCYCLES

CROSS REFERENCE TO RELATED APPLICATIONS

This application asserts priority from U.S. Provisional application Ser. No. 62/336,702, filed on May 15, 2016; and 62/344,733, filed on Jun. 2, 2016, which applications are incorporated herein by reference in their entirety.

FIELD OF THE INVENTION

The invention relates to a system and method to stabilize motorcycles wherein a computer simulation model predicts operating states of the motorcycle, which system and method may be used during design of a motorcycle and/or may be used during operation of the motorcycle to control operation of the motorcycle and provide stability control thereto.

BACKGROUND OF THE INVENTION

Electronic stability control (ESC, also referred to as ESP or DSC) is required by law on passenger cars/SUVs to stabilize the cornering behavior and reduce accidents involving loss of control. ESC for passenger cars is typically an automated brake system combined with engine power reduction in which the brake is individually controlled for each wheel in order to influence the yawing and lateral motion of vehicle.

For motorcycles, motorcycles can become unstable when operating at high speeds and at high cornering levels. For example, they can exhibit an oscillation at the rear wheel commonly known as "weave." ESC for motorcycles (also referred to as ASC/MSC) have appeared on the market. Most of these known stability control systems operate to control only the throttle reduction and front/rear brake distribution with an anti-lock braking system (ABS) in which the brakes are still applied by a rider. Automatically controlling the brakes on a motorcycle without rider intention is risky, with the possible consequence of falling over or in other words, capsizing.

It is an object of the present invention to provide an improved stability control system and method which overcomes disadvantages associated with the prior art.

More particularly, the system and method of the invention presents a controller method for actively applying the brakes on a motorcycle or other similar vehicle having two or more wheels that can improve stability in low-friction conditions without losing safety.

It is well known that motorcycles possess the vibration modes of weave, wobble and chatter. Weave is typically a lightly damped vibration around 2.5-4 Hz that becomes unstable at high speed (>180 km/h) on high-friction surfaces. On low-friction conditions, the weave becomes unstable at mid-range speed, especially during steady cornering. The ESC system and method of the present invention predicts a yaw rate, and applies both front and rear brakes when an oscillation occurs, and only in the part of the vibration where the actual yaw rate is less than the predicted rate. The controller is designed using MATLAB/Simulink software using a high-fidelity, multibody, motorcycle-dynamics model, such as BikeSim®, which is sold by the assignee of the present invention. This software provides a time-domain simulation environment that is used to evaluate the performance of the motorcycle in extreme nonlinear conditions. In addition, a linearized controller and motorcycle model (BikeSim-Linear) are used to examine the stabilities for variations in speed on root locus.

In one example, the controller can be used to predict the yaw rate overlaid with the yaw rate from a fully detailed multibody simulation along with front and rear brake pressures for a 304.8-m constant-radius curve, 50% road friction, ridden with a speed of 145 km/h, and requiring lean of about 30 deg. The controller predicts the yaw rate based on the vehicle's speeds (longitudinal and lateral), roll angle, and steer. The internal controller model includes only a few vehicle properties, such as weight, CG location, wheelbase, etc. As may be shown in plots, the controller preferably applies the brakes only when the actual yaw rate (which would be measured directly in a physical system) is less than the predicted yaw rate. In one scenario, a motorcycle without the inventive ESC falls down after the weave motion builds to an unstable conclusion, while a motorcycle using the system of the present invention would remain upright since the weave mode is stabilized by the inventive ESC in an entire speed range, although the wobble might become a little unstable under some conditions.

The invention described here utilizes a high-fidelity computer simulation model of a 2- or 3-wheel motorcycle or similar vehicle to predict operating states such as yaw rate, lateral acceleration and roll angle for a stable motorcycle at a given speed and steer angle. For purposes of this disclosure, the term motorcycle is used for explanatory purposes, although it will be understood that the invention and its reference to motorcycle would also encompass other two- or three-wheeled vehicles. According to the invention, the operating state of a physical motorcycle can be measured and compared to that of the model at every instant in time to determine if the operating state of the physical motorcycle differs from that of the simulation model in such a way as to indicate loss of stability. The nature of that difference can then be used to intervene in the operation of the motorcycle independent of driver actions by application of brakes, modulating the engine torque or applying torques to urge the steering system in a corrective direction. Thus by comparing the physical response of the motorcycle to that of the computer model in an on-board controller these interventions can be applied at a time and intensity to stabilize the motorcycle and prevent a loss of control.

Other objects and purposes of the invention, and variations thereof, will be apparent upon reading the following specification and inspecting the accompanying drawings.

Figure 1:
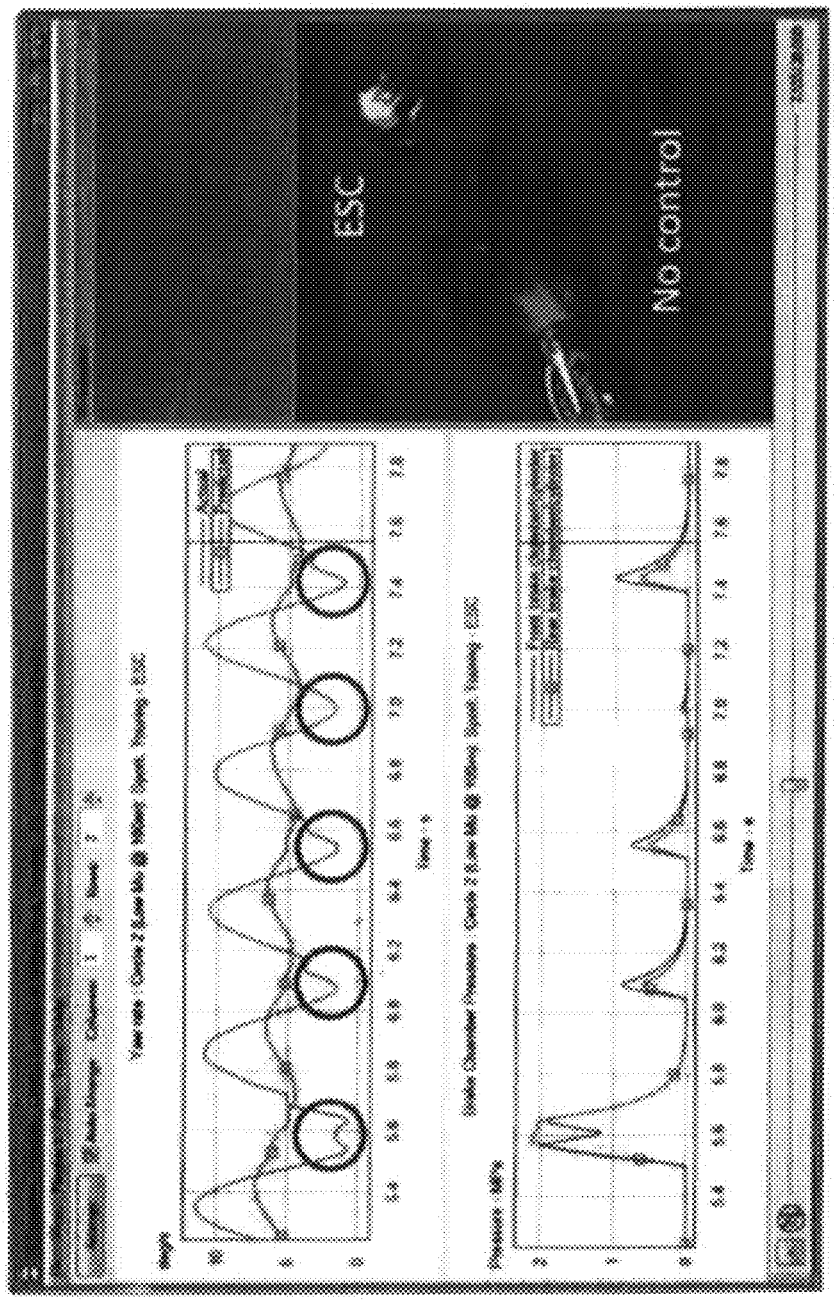
FIG. 1 shows the yaw rates (actual and predicted) and applied brake pressures and an animated comparison between with and without stability control for a vehicle under 145 km/h speed on a 50% low-friction cornering.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
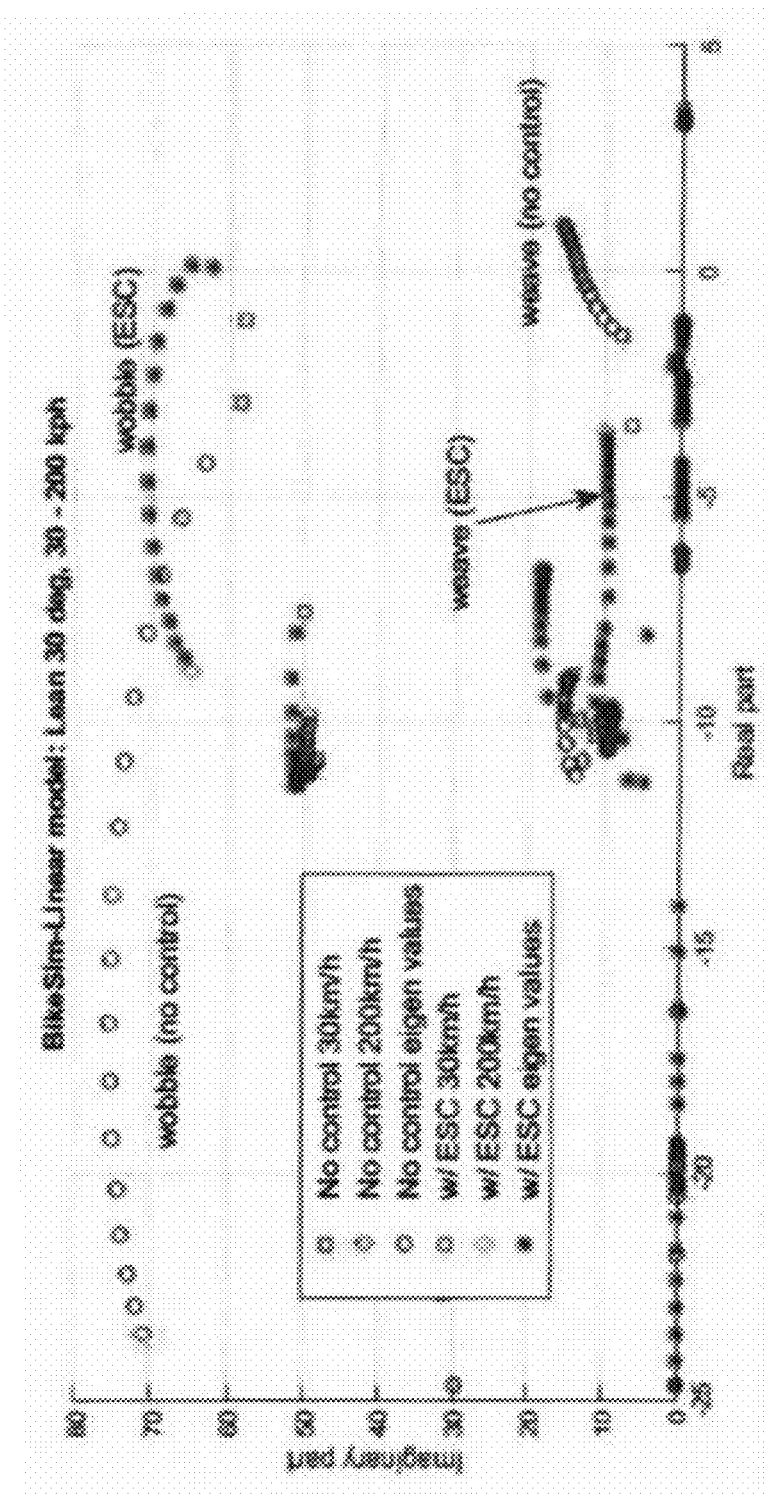
FIG. 2 shows root locus plots from the BikeSim-Linear model (with and without ESC) for small perturbations from steady turning motions on a 50% low-friction surface with variation in speed (30-200 km/h).

Referring to FIGS. 1 and 2, the system and method of the invention preferably incorporates a controller method for actively applying the brakes on a motorcycle or other similar vehicle having two or more wheels that can improve stability in low-friction conditions without losing safety and stability.

Figure 1A:
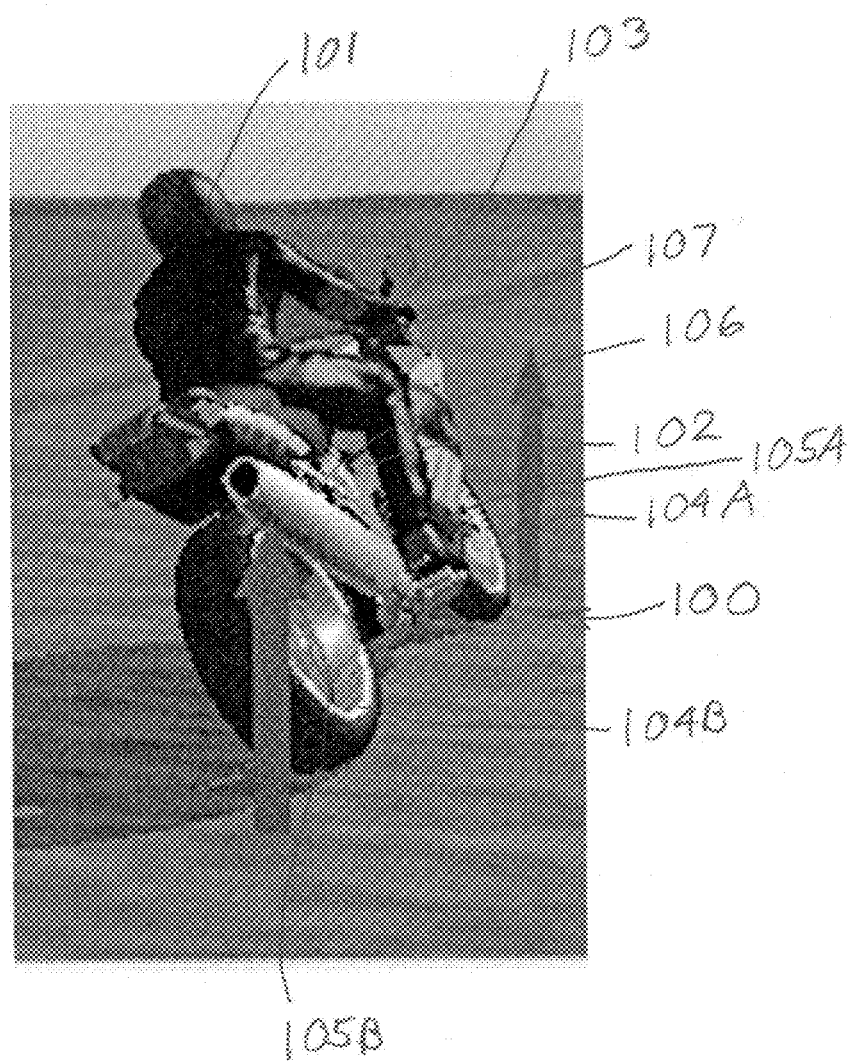
FIG. 1A shows a physical motorcycle including the inventive stability control system.

As disclosed herein and also shown in FIG. 1A, a typical motorcycle 100 or other similar vehicle may possess the vibration modes of weave, wobble and chatter. The motorcycle 100 may have a typical construction operated by a rider 101 and include a chassis 102, steering system 103, front and rear wheels 104A and 104B, respective brakes 105A and 105B for said wheels 104A and 104B, an engine 106 generating engine torque to generate vehicle speed, and a throttle 107 for controlling the vehicle speed. The motorcycle 100 also includes a computer control system described in more detail relative to FIGS. 13 and 14 discussed below. Generally, weave is typically a lightly damped vibration around 2.5-4 Hz that becomes unstable at high speed (>180 km/h) on high-friction surfaces. On low-friction conditions, the weave becomes unstable at mid-range speed, especially during steady cornering. As further disclosed herein, the ESC system and method of the present invention generally predicts a yaw rate, and preferably applies front and/or rear brakes 105A and 105B when an oscillation occurs, and preferably, only in the part of the vibration where the actual yaw rate is less than the predicted rate. The controller is designed using MATLAB/Simulink software using a high-fidelity, multibody, motorcycle-dynamics model, such as BikeSim®, which is sold by the assignee of the present invention. This software provides a time-domain simulation environment that is used to evaluate the performance of the motorcycle 100 in extreme nonlinear conditions. In addition, a linearized controller and motorcycle model (BikeSim-Linear) are used to examine the stabilities for variations in speed on root locus.

As an example of a controller design and simulation results, FIG. 1 shows the yaw rate predicted by the controller overlaid with the yaw rate from the fully detailed multibody simulation along with front and rear brake pressures for a 304.8-m constant-radius curve, 50% road friction, ridden with a speed of 145 km/h, and requiring lean of about 30 deg. The controller predicts the yaw rate based on the vehicle speeds (longitudinal and lateral), roll angle, and steer. The upper graph shows the yaw rate comparison between actual and predicted yaw rates relative to time. The internal controller model includes only a few vehicle properties, such as weight, CG location, wheelbase, etc. The bottom portion of FIG. 1 graphs the brake chamber pressure in MPa over the same time range, wherein the peaks in pressure show the application of vehicle brakes. In this lower graph, the solid line shows the pressure in MPa for the front brake chamber/cylinder, while the solid line with intermittent squares shows the pressure in MPa for the rear brake chamber/cylinder. The pressure is graphed on the vertical axis, with time on the horizontal axis. As shown in these plots, the controller preferably applies the brakes only when the actual yaw rate (which would be measured directly in a physical system) is less than the prediction of the yaw rate, which is the graph portions circled in FIG. 1. The video image on the right side in FIG. 1 shows results with and without the controller wherein the motorcycle is shown tipping over when "No control" is provided, and is shown generally upright when ESC is provided. As shown, the motorcycle without the ESC falls down after the weave motion builds to an unstable conclusion. Therefore, FIG. 1 shows the yaw rates (actual and predicted) and applied brake pressures and an animated comparison between with and without stability control for a vehicle under 145 km/h speed on a 50% low-friction cornering.

Next, FIG. 2 shows root locus plots from the BikeSim-Linear model (with and without ESC) for small perturbations from steady turning motions on a 50% low-friction surface with variation in speed (30-200 km/h). As shown in this root loci, the weave mode is stabilized by ESC in the entire speed range, although the wobble becomes a little unstable.

Figure 3:
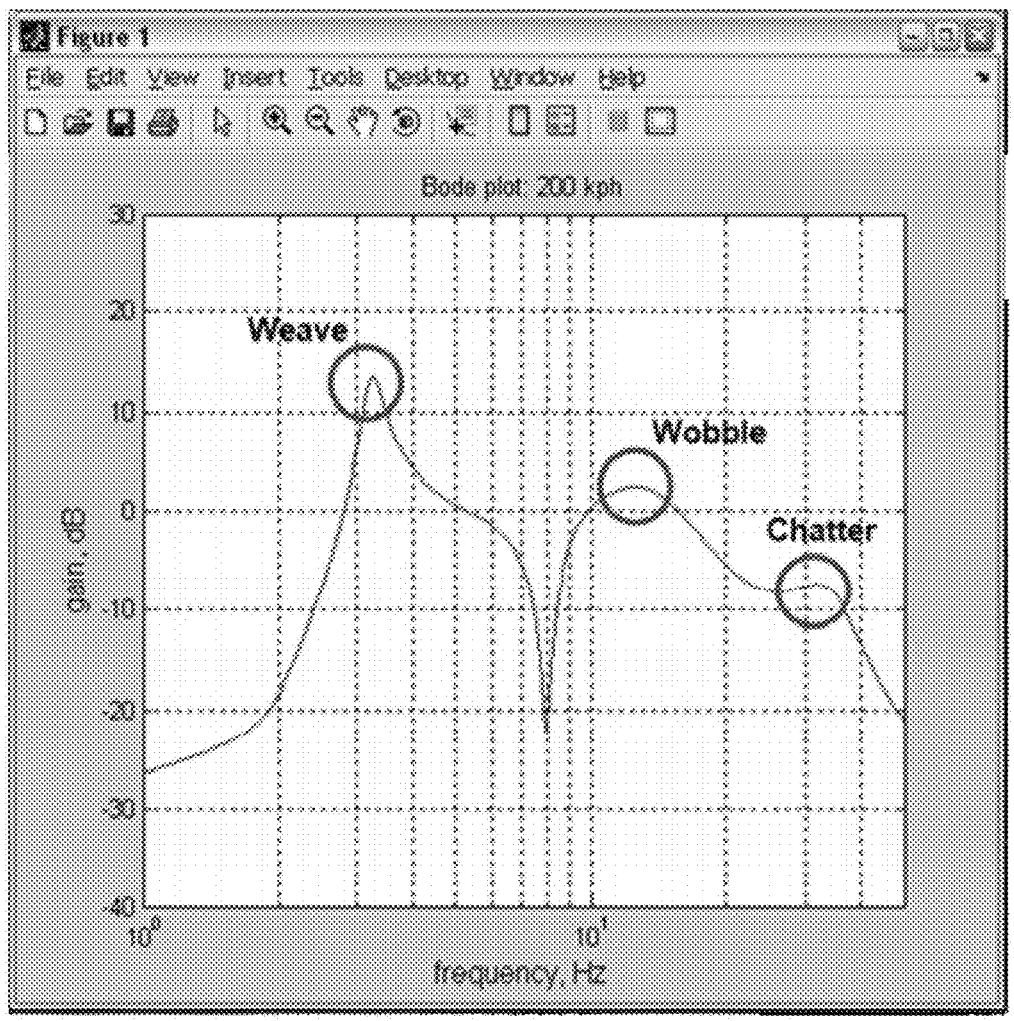
FIG. 3 is a bode plot showing three vibration modes.
Figure 4:
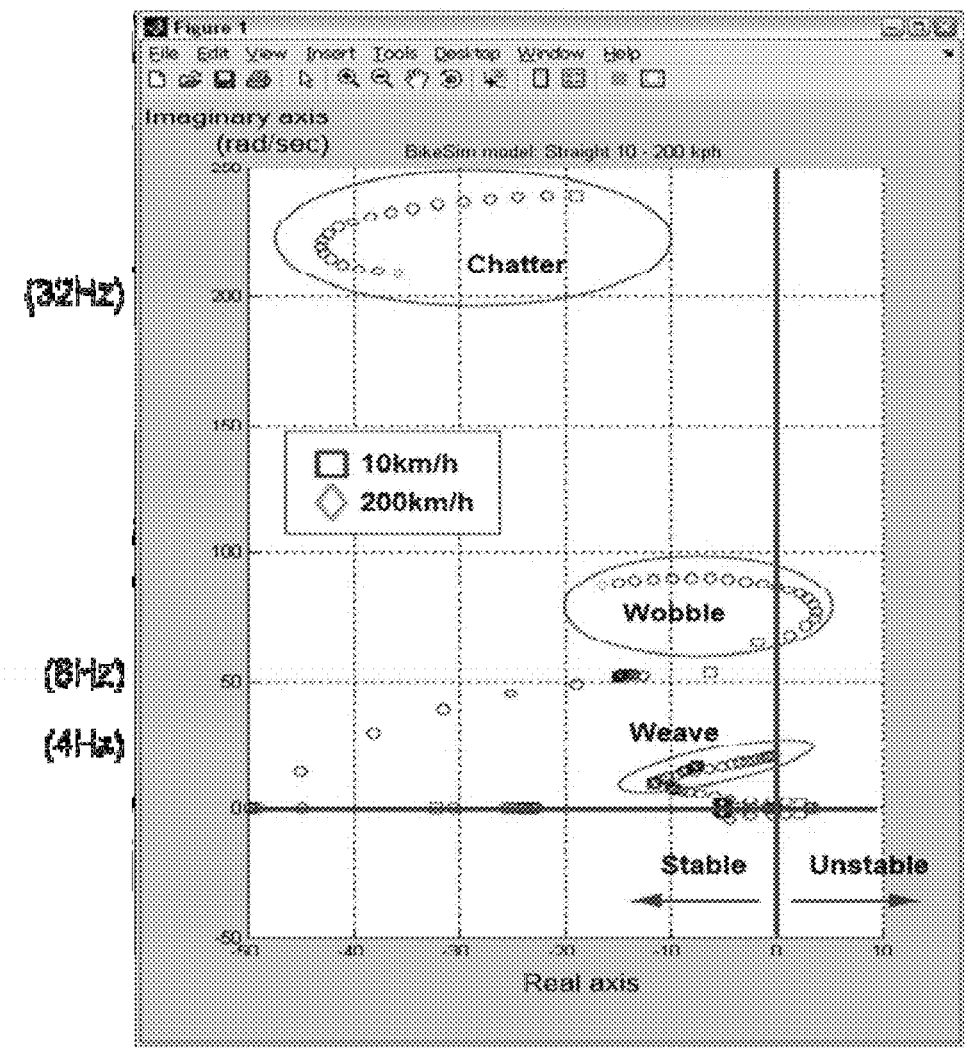
FIG. 4 shows root locus in variation of speed for the three vibration modes of FIG. 3.

FIGS. 3 and 4 are graphs showing typical motorcycle vibrations in motion, wherein FIG. 3 is a Bode plot showing three vibration modes of weave, wobble and chatter, and FIG. 4 shows root locus in variation of speed for the three vibration modes. The imaginary axis of FIG. 4 is shown in rad/sec, which also is converted to show the axis values for 4 Hz, 8 Hz and 32 Hz. The real axis plots the transition line or region between stable and unstable performance of the vehicle. This graph plots a speed range of 10 km/h to 200 km/h, with the 10 km/h data point for each vibration mode being represented by a square symbol at one end of a series of data plots, and the 200 km/h data point being represented by a diamond symbol at another point on the data plot. These graphs show a first vibration mode of weave: 2-3 Hz vibration in yaw and lateral motion of entire chassis, wherein weave becomes unstable at high speed (180<km/h). The vibration mode of wobble is shown at 10-13 Hz vibration on steering head, wherein wobble becomes unstable in mid-speed range (60-80 km/h). The third vibration mode of chatter is 25<Hz in twist, bend and steer of front fork, wherein chatter becomes unstable at high speed with high lean cornering (230<km/h, 50<degree lean). From FIGS. 3 and 4, those three vibration modes can be identified on bode plot and root locus with variations of speed.

Figure 5:
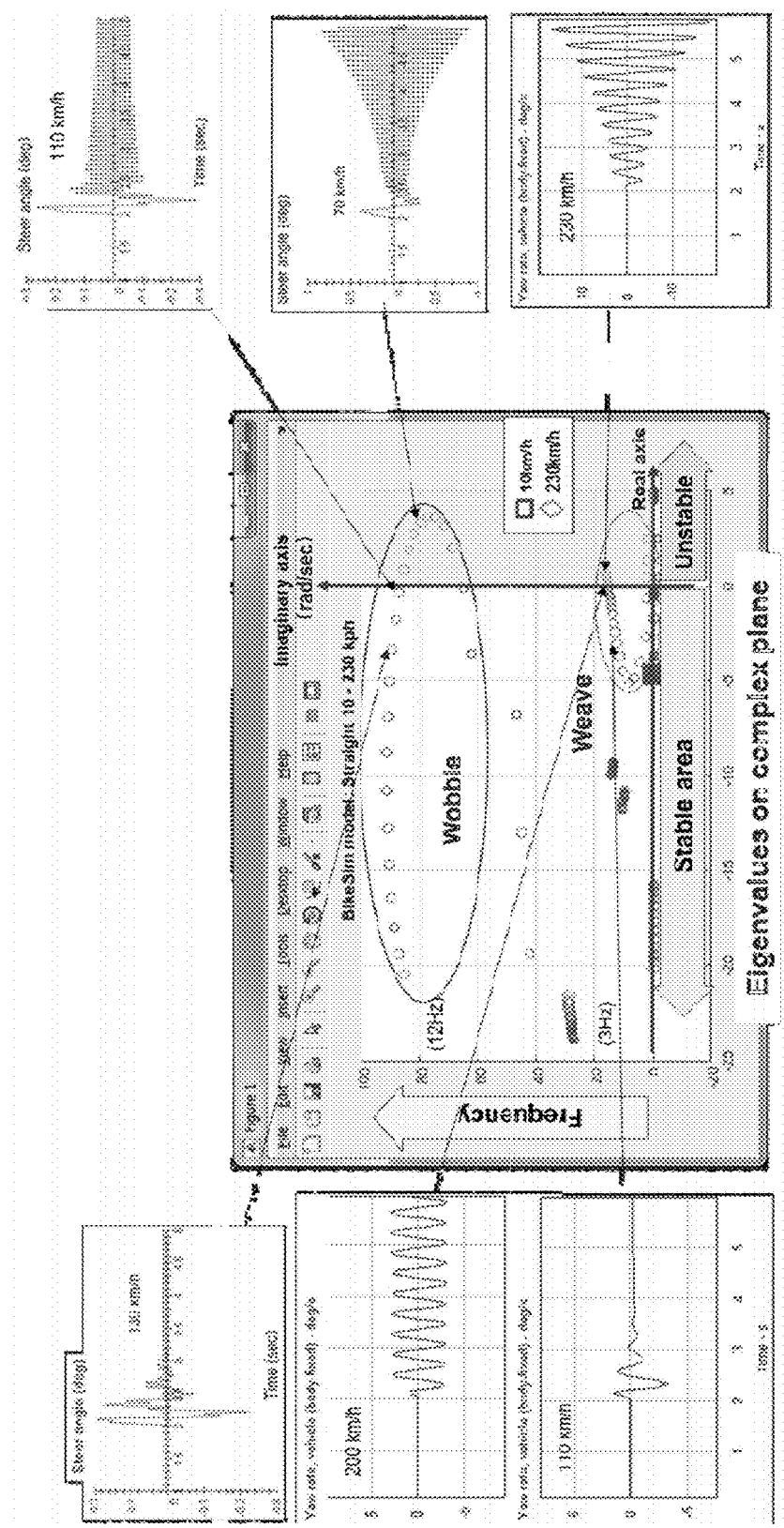
FIG. 5 shows the relationship between eigenvalues on a complex plane and time responses of motorcycle vibrations.

FIG. 5 shows the relationship between eigenvalues on a complex plane and time responses of motorcycle vibrations. In FIG. 5, the eigenvalues in variations of speed for a sport touring motorcycle are plotted. Circles are the eigenvalues in speed between 20-220 km/h. Rectangle and diamond data points are the eigenvalues at 10 and 230 km/h, respectively. The plot includes the imaginary axis and the real axis, wherein areas on either side of the imaginary axis are the stable area where motorcycle operation is stable and the unstable area where motorcycle operation becomes unstable with a transition region located therebetween. For Eigenvalues in the higher area of the imaginary axis, the higher the frequency. For Eigenvalues in the left side (negative side in the real axis) the values are stable and converging; while in the right side (positive in real axis) the values are unstable and diverging. The outer graphs on the left and right sides outside of the main graph show various conditions for the steer rate associated with Wobble, and yaw rate associated with weave. Wobble appears in these steer angle graphs; weave appears in these yaw rate graphs of the vehicle chassis. As can be seen, the weave motion becomes unstable with higher speed.

Figure 6:
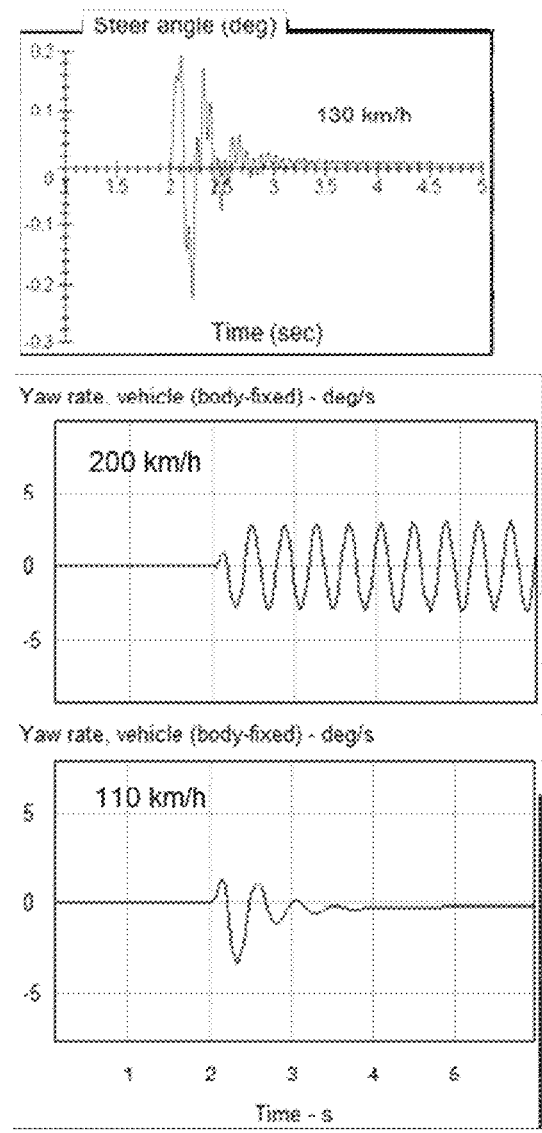
FIG. 6 is an enlarged view of the left side graphs showing the steer angle at the location indicated in FIG. 5, and the yaw rates for the two locations of FIG. 5.
Figure 7:
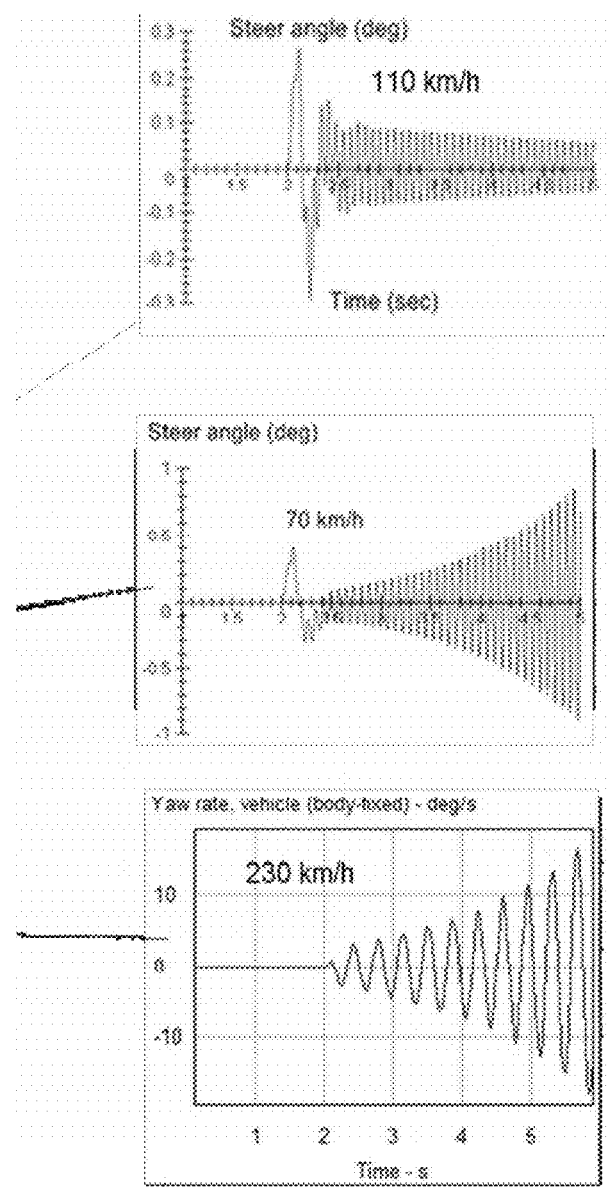
FIG. 7 is an enlarged view of the right side graphs showing the steer angles at two locations in FIG. 5 and the yaw rate for the location seen in FIG. 5.

Generally as to the left side outer graphs of FIG. 5, these left side graphs from top to bottom show: the steer angle at a first wobble location shown by the reference arrow in the stable region; the yaw rate at a second weave location near the stable/unstable transition line; and the yaw rate at a first weave location in the stable region. As to the right side outer graphs of FIG. 5, these right side graphs from top to bottom show: the steer angle at a second wobble location shown by the reference arrow near the stable/unstable transition line; the steer angle at a third wobble location in the unstable region; and the yaw rate at a third weave location in the unstable region. Essentially, these different graph locations are taken at increasing vehicle speeds. FIG. 6 is an enlarged view of the left side graphs showing the steer angle at the location indicated in FIG. 5, and the yaw rates for the two locations of FIG. 5. As can be seen, the vibration plots for the steer angle at the first wobble location and the yaw rates for the first and second weave locations are either converging or at least non-divergent and therefore stable. FIG. 7 is an enlarged view of the right side graphs showing the steer angles at two locations in FIG. 5 and the yaw rate for the location seen in FIG. 5. As can be seen, the steer angle graph for the second wobble location is convergent since the vehicle is in the stable region, while the two graphs for steer angle and yaw rate are divergent in the unstable region. Since FIG. 5 shows a simulation model for a vehicle or motorcycle operating along a straight path with the vehicle upright, the transition to the divergent conditions shows the effects of increasing vehicle speeds that can cause unstable weave.

Figure 8:
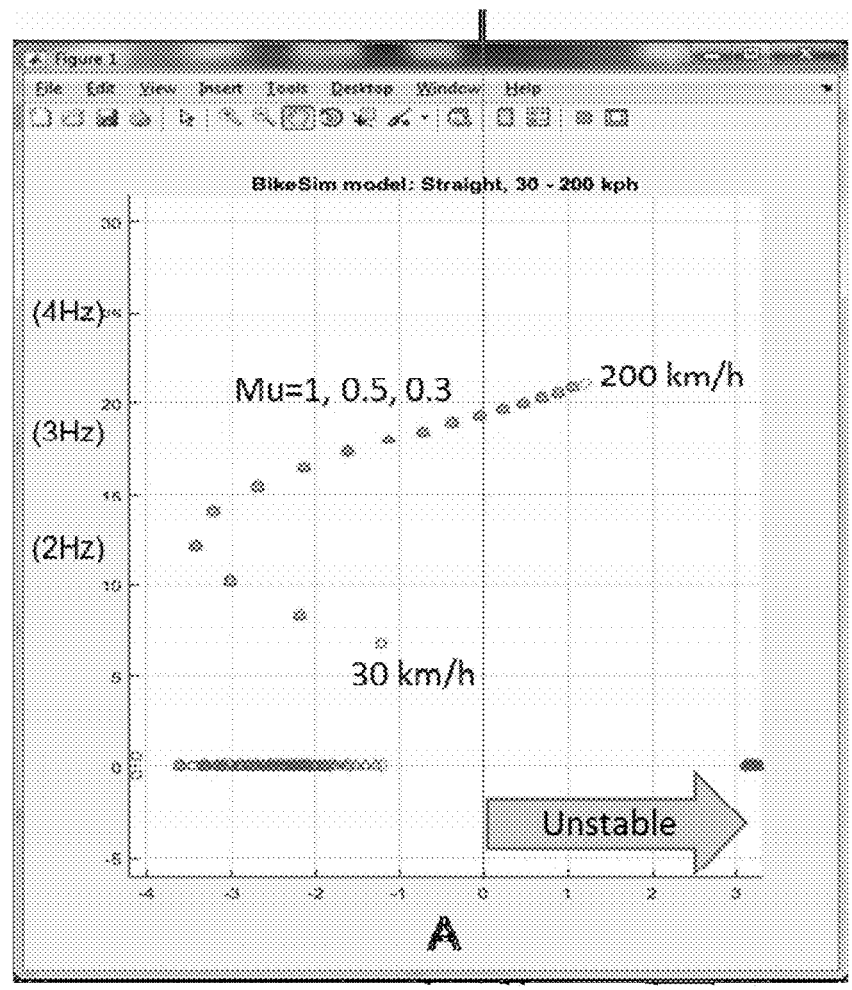
FIG. 8 shows eigenvalues in variations of speed with variations of road Mu (friction) with a straight run for a speed range of 30-200 km/h.
Figure 9:
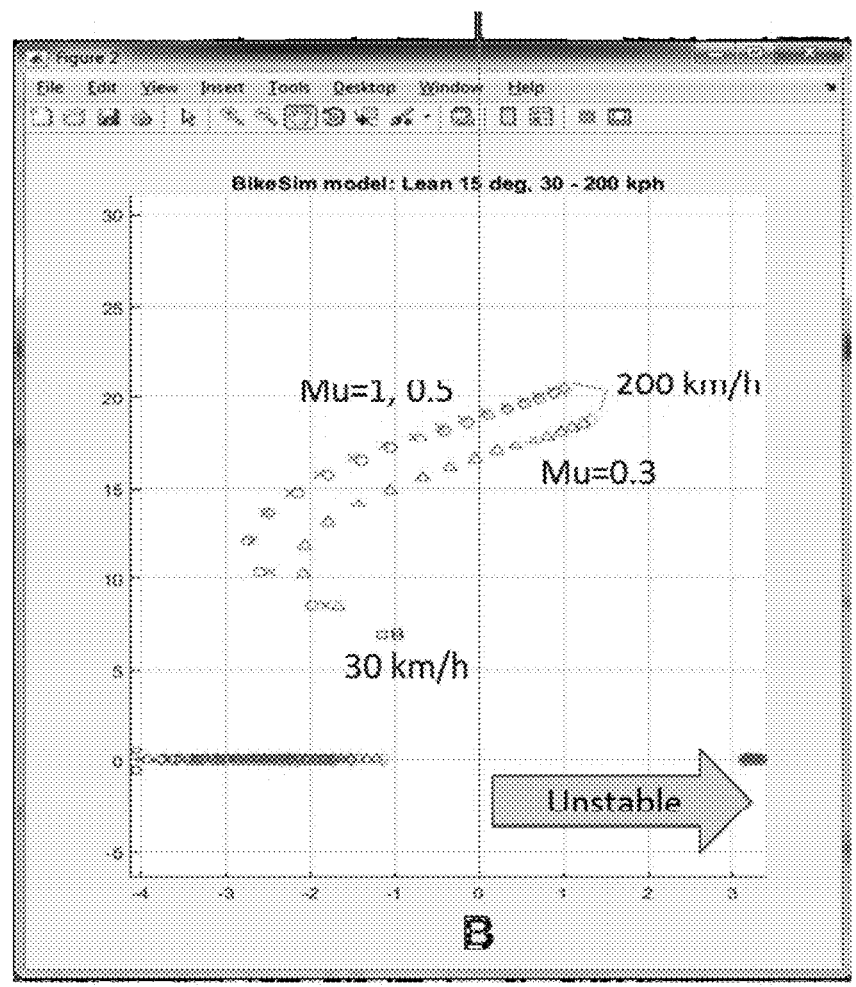
FIG. 9 shows the eigenvalues with a 15 degree lean angle of a motorcycle chassis (such as on a cornering).
Figure 10:
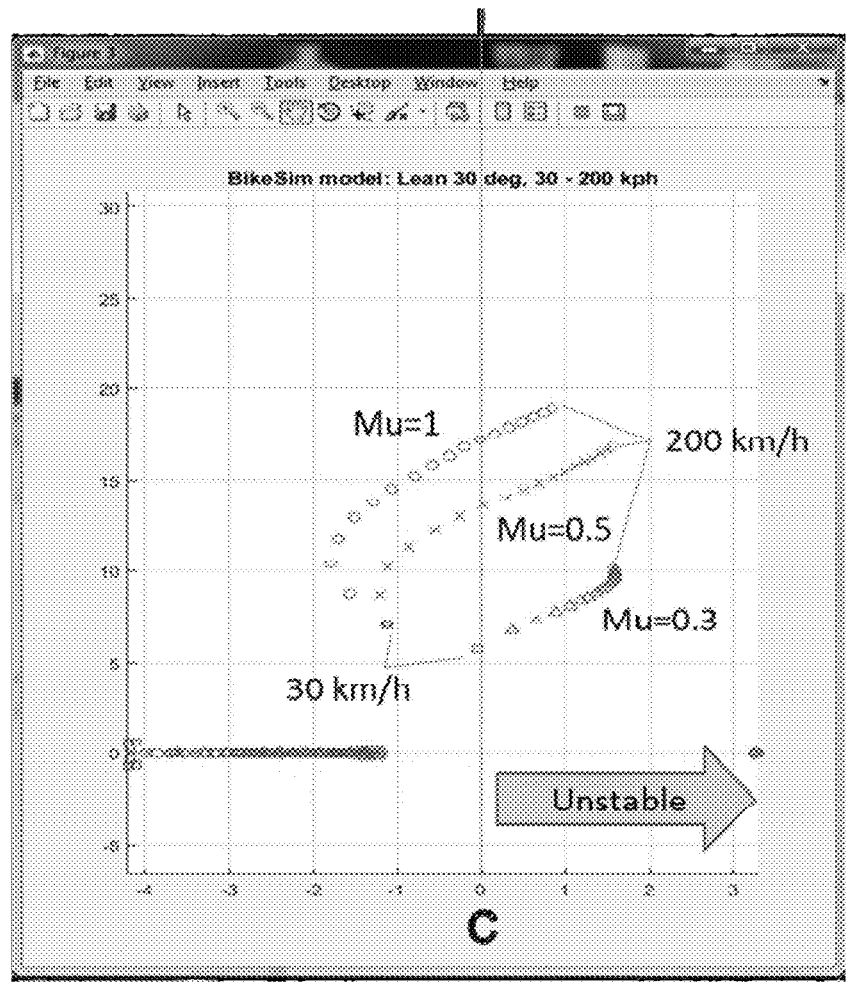
FIG. 10 shows the motorcycle running with a higher lean angle of 30 degrees.

Next, the plots of FIGS. 8-10 show eigenvalues in variations of speed with various lean angles and road Mu (friction) including the rider's steering operation. FIG. 8, labelled as A, shows the eigenvalues with a straight run for a speed range of 30-200 km/h. As can be seen, the weave becomes unstable at 150 km/h. However the stability is not affected by road Mu, which was calculated at 1, 0.5 and 0.3.

FIG. 9, labelled as B, shows the eigenvalues with a 15 degree lean angle of motorcycle chassis (such as on a cornering). As shown in this figure, the boundary between stable and unstable areas becomes lower at a lower speed on the lowest road friction of 0.3, while the transition boundary or region between stable and unstable operation occurs at a higher speed for the higher road conditions for Mu of 1.0 and of 0.5.

When the motorcycle runs with higher lean angle (30 degrees in FIG. 10, which is labelled as C), losing stability is more severe the lower the road friction, which is plotted at 0.3, 0.5 and 1. In other words, the vehicle becomes unstable at a lower speed when Mu is 0.3 than when Mu is at higher values of 0.5 and 1.0. Therefore, loss of stability on high-speed cornering with increased lean on low friction roads is a potential safety problem for motorcycles.

Figure 11:
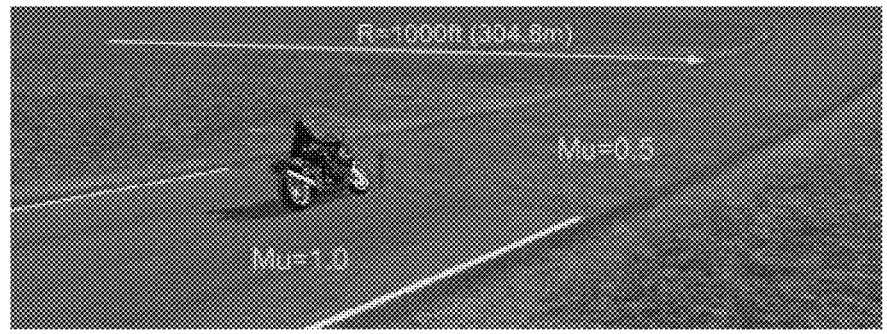
FIG. 11 shows an example of a testing maneuver without stability control for a motorcycle cornering in a curve.

FIG. 11 shows an example of a testing maneuver without stability control for a motorcycle cornering in a curve. This example maneuver does not have stability control wherein the motorcycle speed is 145 km/h (90 mph) running on a constant radius of curve R=304.8 m (1000 feet). Road friction (Mu) drops from 1.0 to 0.5 at a certain location on the curve, wherein Mu is 1.0 upon entering and beginning the curve, and drops to Mu=0.5 as the vehicle continues through the corner. Essentially, there is a first portion of a road or path with a Mu of 1.0, and a second portion of the road/path contiguous thereto wherein the road friction of the second road portion drops or transitions to a Mu of 0.5. The change in Mu can occur due to environmental conditions such as ice or rain, or road condition such as the road surface changing from one material to another, or the road surface being covered with foreign matter such as sand or dirt, or the change may occur due to any other change in the surface conditions along the path being traveled by the vehicle. FIG. 11 essentially is a computer-generated graphical screen shot of the vehicle shown as a two-wheel motorcycle, and the road environment and this screen shot or visual display can be generated by the computer system of the present invention.

Figure 12:
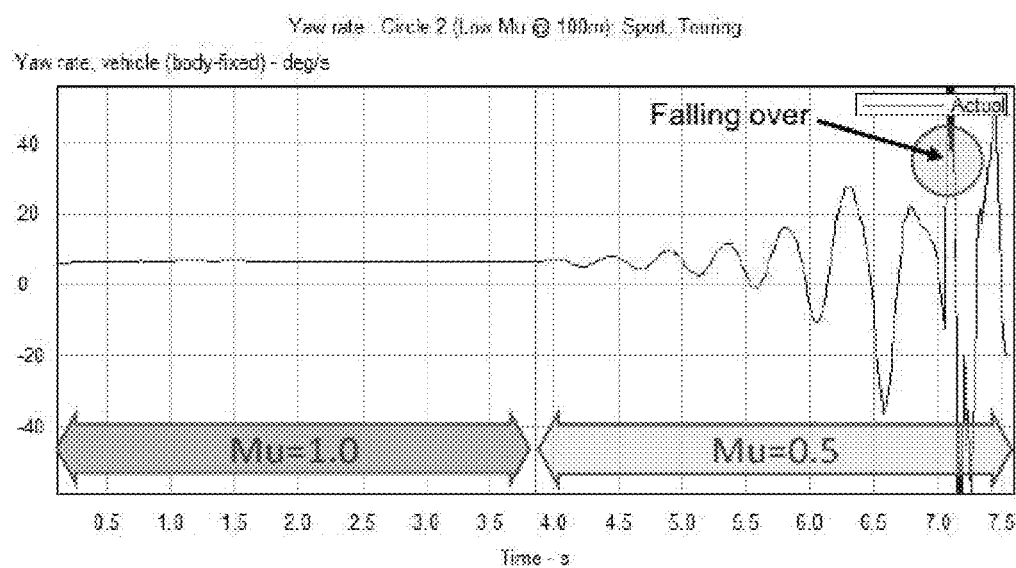
FIG. 12 is a graph showing a simulation result for the yaw rate of the motorcycle as the reduced Mu portion of the curve is encountered by the motorcycle.

FIG. 12 is a graph showing a simulation result for the yaw rate of the motorcycle as the reduced Mu portion of the curve is encountered by the motorcycle. According to the simulation result shown in FIG. 12, the yaw rate encounters the weave oscillation when the bike is on the low friction area wherein the weave vibration begins to diverge. The bike eventually falls over after the diverging of the weave oscillation as indicted on the graph. Once the weave oscillation begins to diverge, the vehicle begins to become unstable and if uncorrected by the present invention, the weave can continue to increase until it reaches a critical failure level at which the vehicle falls over or capsizes.

As noted above relative to FIGS. 1 and 2, the present invention can be applied to the motorcycle by installation of an ESC to the vehicle which is operated in accordance with the following discussion. The ESC system and method of the present invention generally predicts the yaw rate, and preferably applies front and/or rear brakes when an oscillation occurs, and preferably, only in the part of the vibration where the actual yaw rate is less than the predicted rate.

Figure 13:
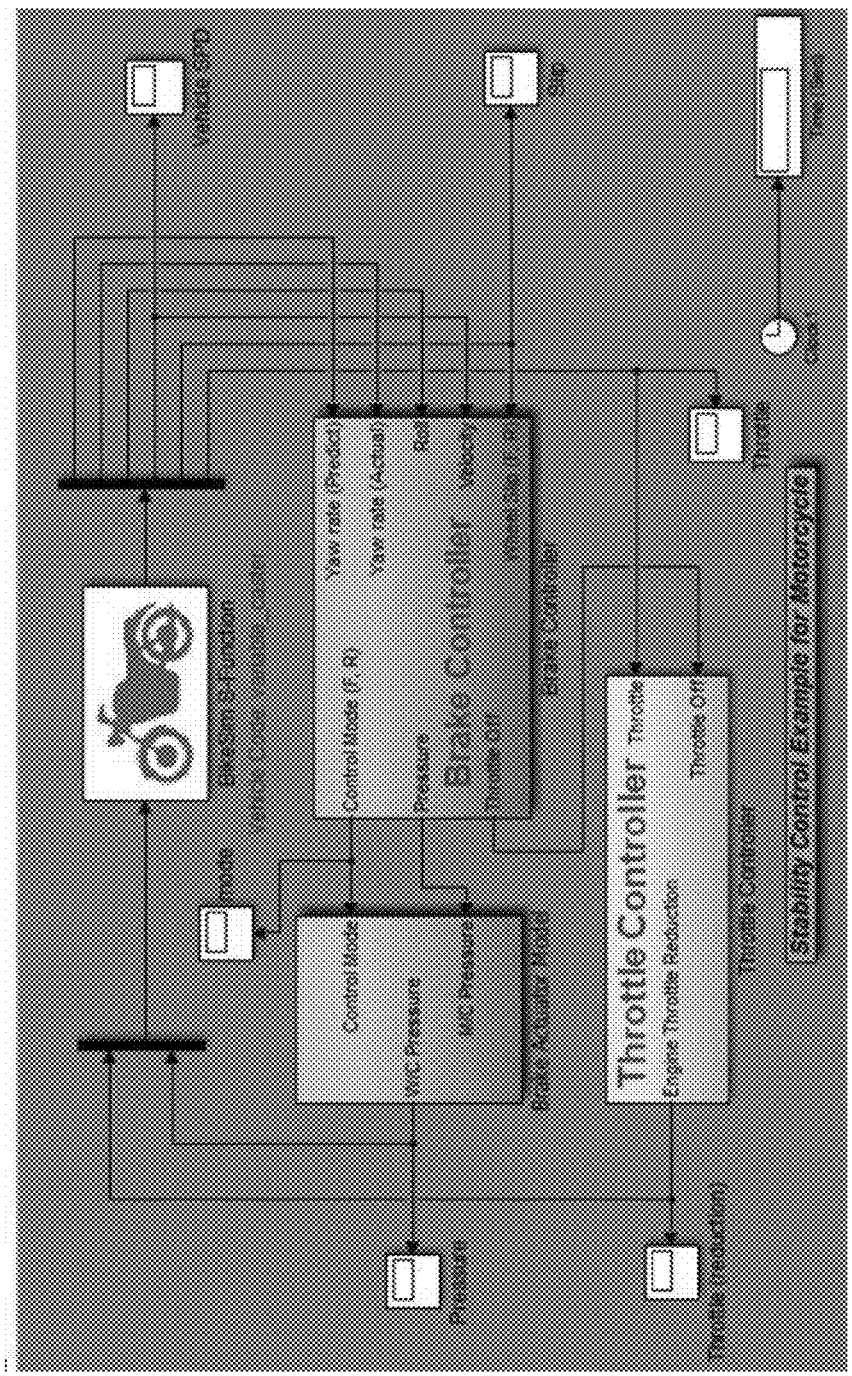
FIG. 13 illustrates a stability control design for the vehicle.

FIG. 13 illustrates a stability control design for the vehicle. FIG. 13 illustrates the inventive stability control system which implements the method thereof. The stability control system preferably includes a brake controller and a throttle controller, as well as a simulation controller wherein the inventive system monitors the vehicles dynamic operating state including various system parameters, and then implements selected control interventions in response to driving state variables encountered or experienced by the vehicle, such as the motorcycle. The brake controller may receive information associated with the yaw rate predicted, yaw rate actual, roll, velocity and wheel slip. In more detail, sensors may be included on the bike to detect the dynamic vehicle conditions for various parameters of the vehicles such as the vehicle speed, slip, throttle, and brake pressure for the front and/or rear brakes. The controller monitors the instability of vehicle states by preferably comparing the actual yaw rate and yaw rate that is predicted theoretically based on the current vehicle speed, lean angle and steer. The controller coordinates with the brake controller and throttle controller to automatically apply brakes and/or reduces throttle to reduce the difference between the actual yaw rate and predicted yaw rate. For example, the brake controller may communicate with a brake actuator model or controller to provide an instruction signal MC Pressure which can govern a WC Pressure to vary the brake pressures for the front or rear brakes. Further, the Brake Controller may supply a Control Mode (Front, Rear) to the Brake Actuator Model. The Brake Controller can also provide a Throttle Off signal to the Throttle Controller, wherein the Throttle Controller may control an Engine Throttle Reduction to the throttle wherein throttle reduction may also be provided in coordination with the actuation or application of the brakes to counteract an unstable weave condition. In this regard, the controller may automatically apply the brakes and reduce throttle to reduce the difference in the actual yaw rate and predicted yaw rate. FIG. 1 illustrates an example of brake pressure being periodically increased to apply the brakes at selected times during the yaw cycle.

Figure 14:
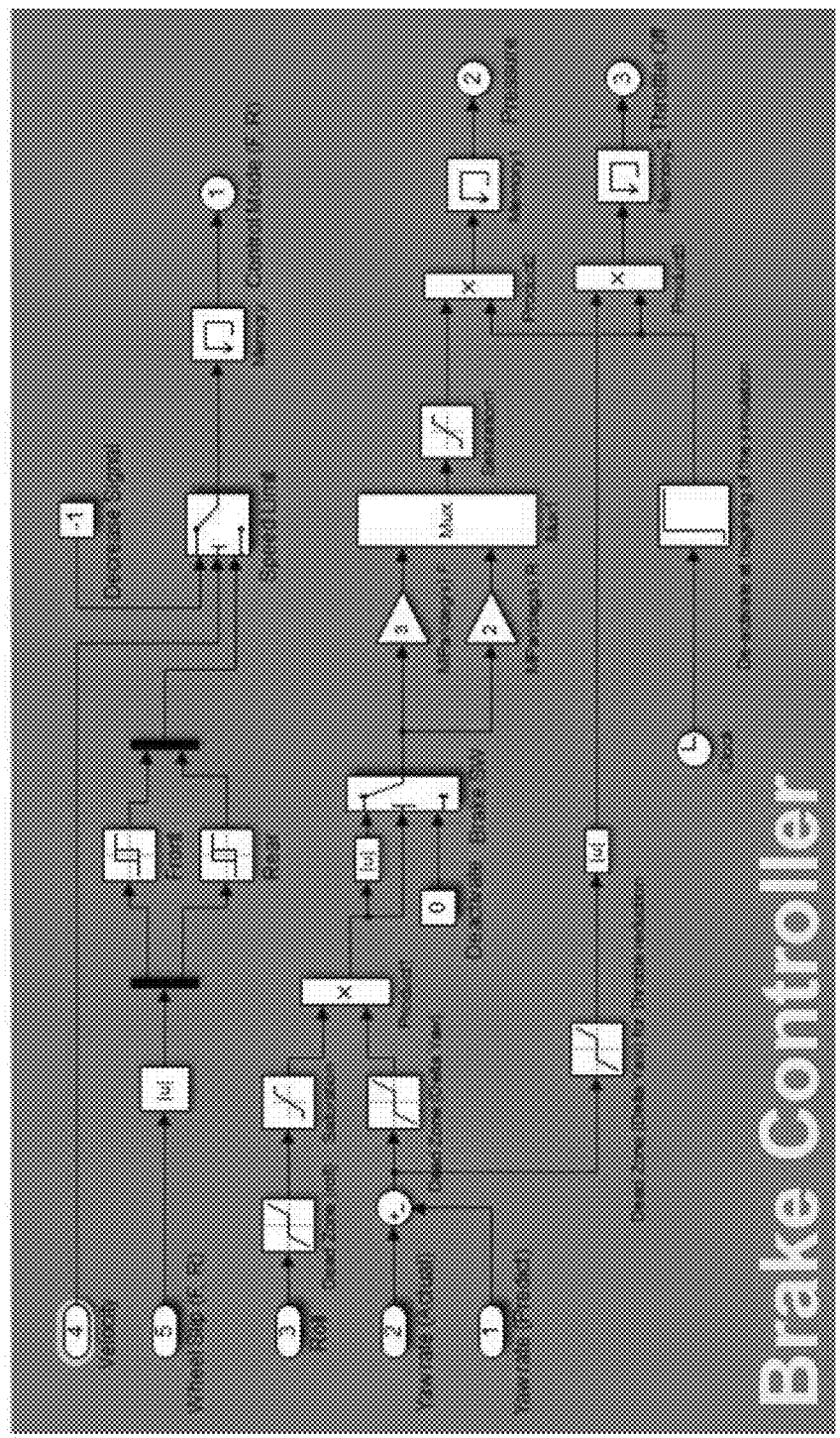
FIG. 14 diagrammatically illustrates one example of the brake controller.

FIG. 14 diagrammatically illustrates one example of the brake controller. In this brake controller, the system can include various processors and control devices to receive inputs such as yaw rate predicted 1, yaw rate actual 2, roll 3, velocity 4 and wheel slip (Front, Rear) 5. In one aspect, the Brake Controller determines the Control Mode (F, R) 1 which is one output. In another aspect, the Brake Controller determines the brake pressures for the front and rear brakes and outputs Pressure 2 and Throttle Off 3 in accord with the foregoing discussion of FIG. 13.

With this system, several steps may be performed and information processed to apply the brakes and reduce the throttle. As one step, the system theoretically predicts the yaw rate based on the current longitudinal and lateral vehicle speeds, lean angle and steer angle. The vehicle would include various sensors for detecting these operating parameters and providing data associated therewith to the system controllers and processor. Brake pressure is calculated preferably by proportion of the difference between the actual and predicted yaw rates multiplying a tunable gain parameter whereas the brake is only applied when the actual yaw rate is less than the predicted yaw rate and the difference between them are bigger than a tunable threshold for the brakes. Preferably, the throttle is reduced automatically when the difference between actual yaw rate and predicted yaw rate exceeds a tunable threshold for the throttle. As such, the throttle may be reduced from the current throttle input of the rider. The applied brake pressure from the controller can be limited to certain pressure level. Further, the applied brake pressure can be modulated by ABS. The controller can be deactivated when lean angle is smaller and/or bigger than a certain lean angle.

Figure 15:
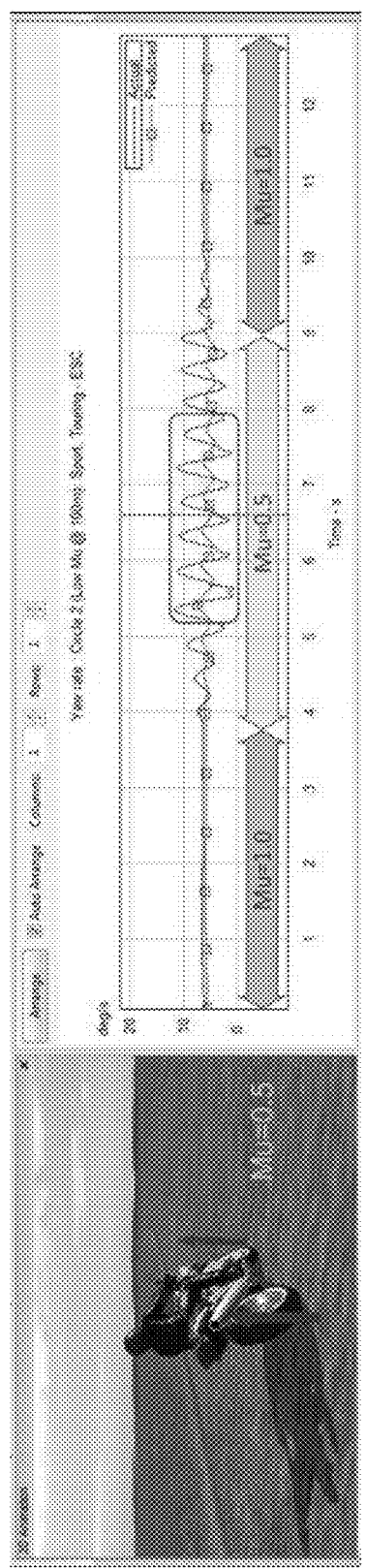
FIG. 15 is an example of a testing maneuver when the vehicle is provided with stability control.
Figure 16:
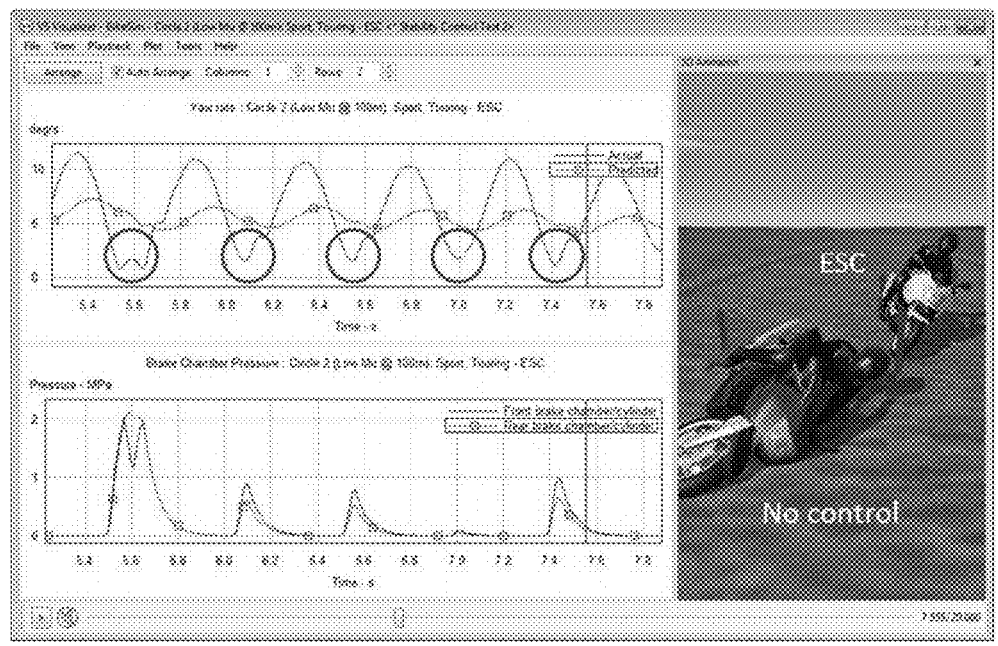
FIG. 16 is an enlarged portion of the graph of FIG. 15 when the stability control is activated to stabilize the vehicle.

Next, FIG. 15 is an example of a testing maneuver when the vehicle is provided with stability control. Generally, motorcycle is shown travelling along a road, wherein the graph shows an initial road portion with a Mu of 1.0, which then transitions into a second road portion with a reduced Mu of 0.5, and then transitions back to a third road portion of an increased Mu of 1.0. FIG. 15 shows the yaw rate for the vehicle which is basically stable throughout the first road portion. FIG. 15 shows the predicted yaw rate and actual yaw rate shown simultaneously on the graph. Upon entering the second road portion, Mu decreases and the actual yaw rate begins to diverge and exceed the predicted yaw rate for stable operation. The circled portion of the graph shows the application of the invention to reduce the yaw rate. FIG. 16 is an enlarged portion of the graph of FIG. 15 when the stability control is activated to stabilize the vehicle. This test is similar to the no control example illustrated above. As further seen in FIG. 15, the yaw rate is stabilized enough so that it remains non-divergent for the remainder of the second road portion, and upon entry of the motorcycle into the third road portion with the increased Mu of 1.0, the yaw rate converges until it becomes fully stable and basically tracks the predicted yaw rate.

In the example of FIGS. 15 and 16, stability control is applied on the same testing maneuver in which the bike without stability control falls over. As seen in FIG. 16, the brake is applied by the controller only when the actual yaw rate is smaller than the predicted yaw rate (circled area on FIG. 15). In FIG. 16, the top of the graph shows the comparison of the predicted yaw rate (indicated by the cyclic plot with intermittent squares) and the actual yaw rate (solid line plot). The actual yaw rate cycles above and below the predicted yaw rate, and the portions of the actual yaw rate which are lower than the predicted yaw rate are circled. The bottom portion of FIG. 16 plots the pressure in MPa for the front brake chamber/cylinder (solid plot), and the rear brake chamber/cylinder (plot with intermittent squares). FIG. 16 generally shows that the front and rear brakes are preferably applied together during the periods of the yaw rate graph when the actual yaw rate is lower than the predicted yaw rate. This is the least unstable portion of the yaw rate cycle, and allows braking to be applied to reduce the divergence of the yaw rate. As can be seen, the front and rear brakes may be applied differently in response to the actual yaw rate. For example, too much brake torque may cause the wheels to lock up which may cause the tires to lose their grip on the ground and the vehicle may possibly fall over. Therefore, each brake might be modulated by an ABS system in order to prevent an excessive brake torque. As can be seen in the first cycle brake intervention, the front brake pressure is cut off by ABS after a first pressure peak and the successive pressure recovers the first pressure peak level. If the actual yaw rate of the motorcycle improves during the next cyclic reduction in the actual yaw rate, the brakes may be applied differently such as to lower pressure peaks which may be the same or different for the front and rear brakes. The brakes may be applied during each successive cycle of the actual yaw rate as the actual yaw rate falls lower than the predicted yaw rate, and if the yaw rate is improving or becoming convergent, very little brake pressure might be applied during a next yaw rate cycle. If the next yaw rate cycle starts to become more divergent during the next yaw rate cycle, the brake pressures may be applied at a higher pressure on this next cycle in comparison to the previous yaw rate cycle. In the meantime, an ABS controller always monitors an excessive brake torque, and if detected, it cuts off the brake pressure. As seen in FIG. 15, the system of the invention improves the actual yaw rate such that the yaw rate does not diverge with use of the stability control on the low Mu area and soon converged when the bike gets back on the high Mu area.

Figure 17:
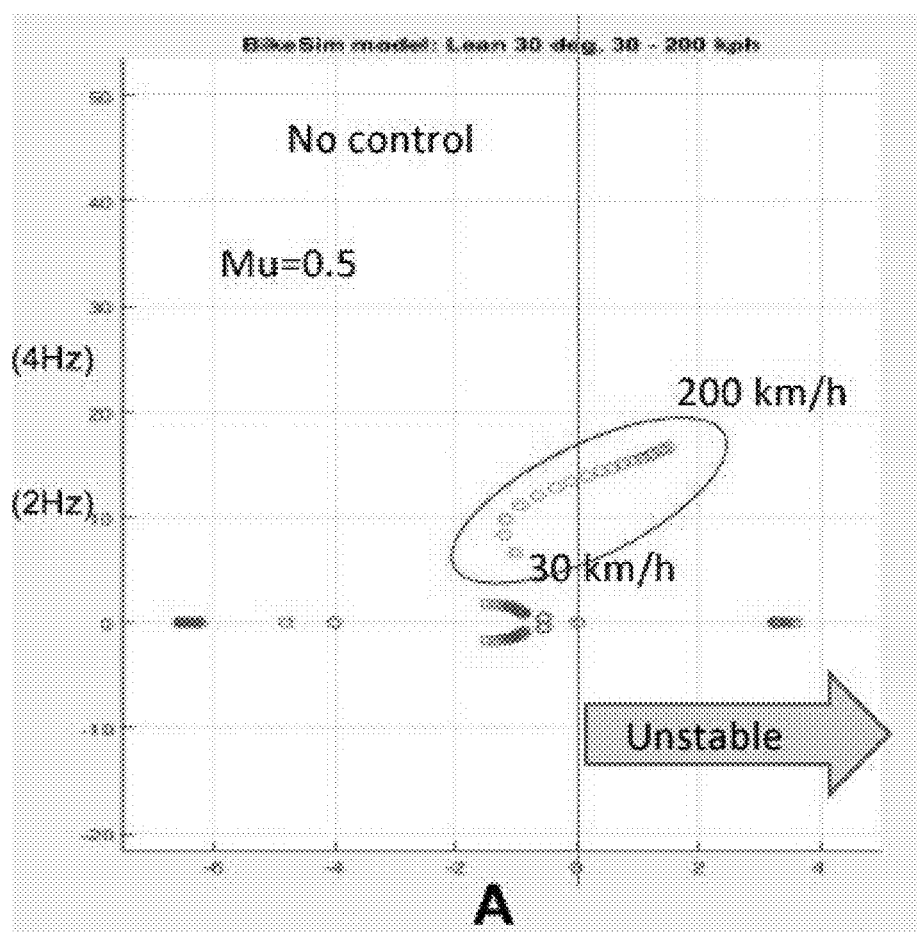
FIG. 17 shows the eigenvalues without control.
Figure 18:
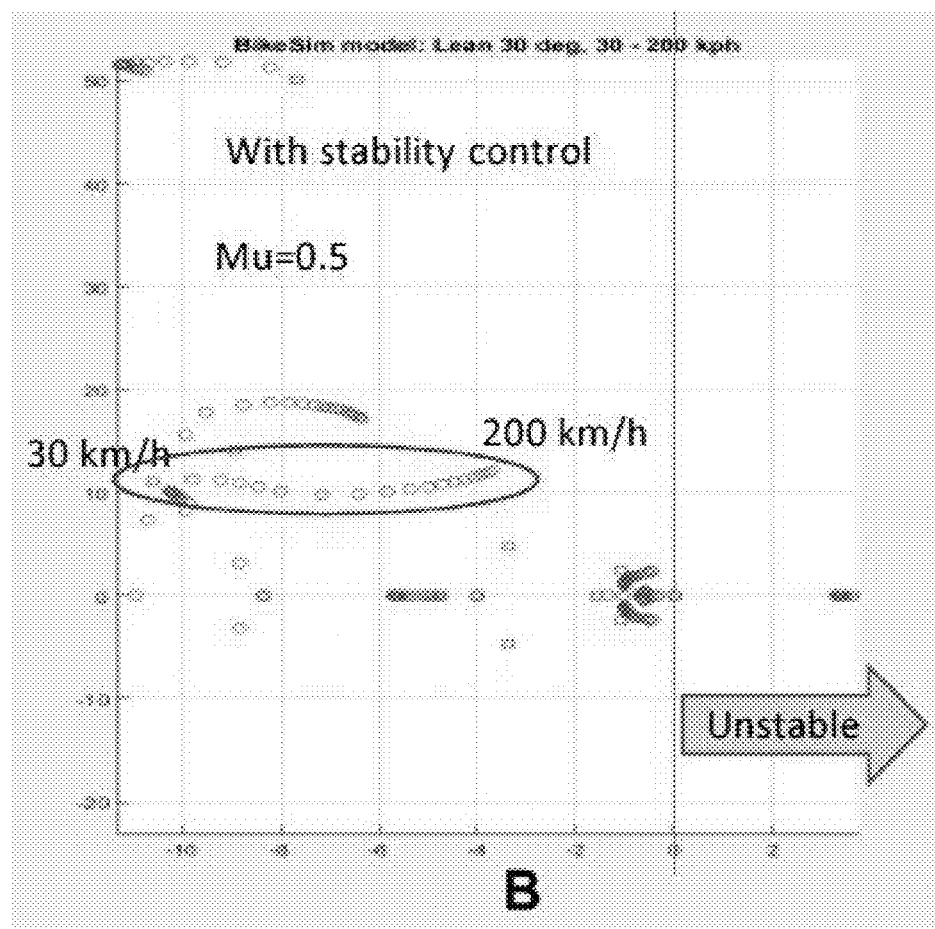
FIG. 18 shows the eigenvalues with the inventive stability control in which the brakes are applied only when the actual yaw rate is less than the predicted yaw rate FIG. 19 the eigenvalues with applied brake pressure during the outer phase (i.e. the brake is applied when the actual yaw rate exceeds the predicted yaw rate).
Figure 19:
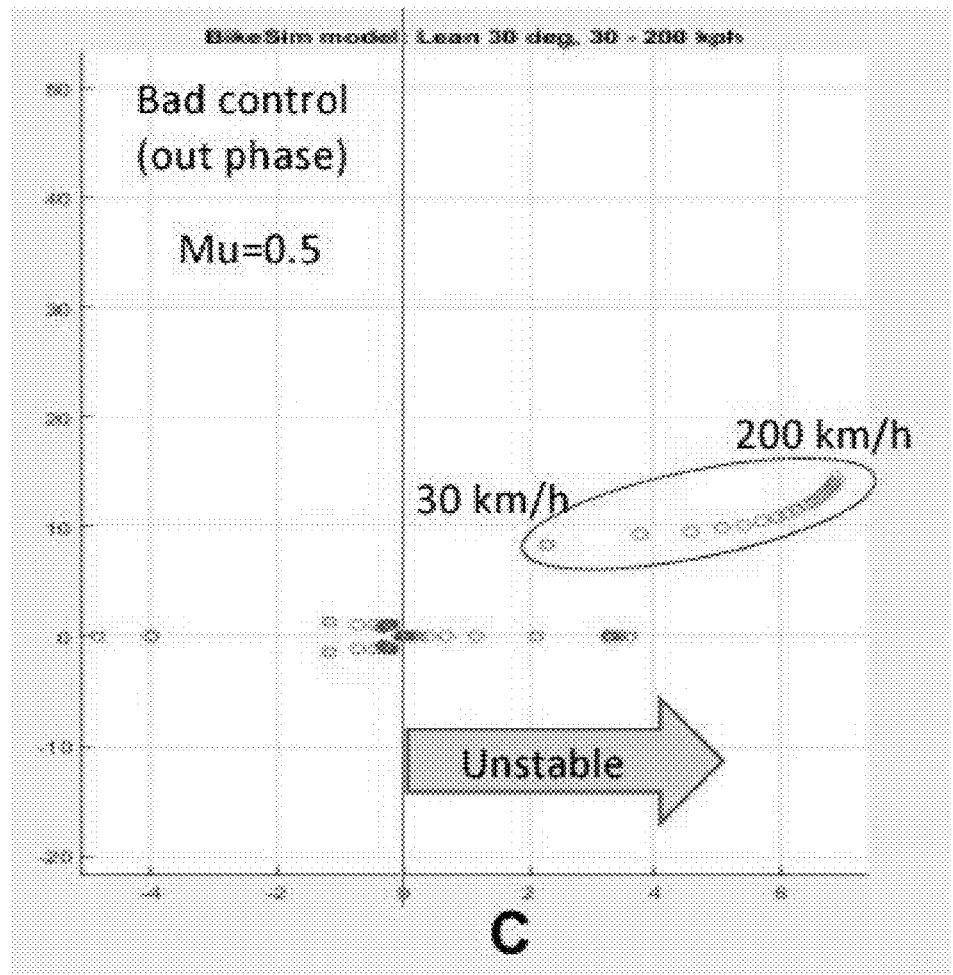

Referring to FIGS. 17, 18 and 19, these plots show eigenvalues in variations of speed with and without brake pressure control during low-friction cornering (Mu=0.5, 30 degree lean angle). FIG. 17 labelled as A shows the eigenvalues without control. Half of the speed range (low speed) is on the stable side while the other half (high speed) is on the unstable side. FIG. 18 labelled as B shows the eigenvalues with the inventive stability control in which the brakes are applied only when the actual yaw rate is less than the predicted yaw rate. As shown in FIG. 18, the whole speed range is on the stable side. FIG. 19 labelled as C shows the eigenvalues with applied brake pressure during the outer phase (i.e. the brake is applied when the actual yaw rate exceeds the predicted yaw rate). As shown in FIG. 19, the whole speed range is on unstable side. Therefore, the correct timing of applying brakes is a key part of the inventive controller and may be essential to stabilize the motion.

In summary, the inventive controller can stabilize the motorcycle weave motion on low friction cornering. The invention therefore relates to the method to stabilize a motorcycle by observing its dynamic operating state, and instituting some control interventions in response to the driving state variables. The effectiveness of the stabilization is optimized by correct adjustment of the control tuning parameters. Below are lists of representative items in each of these categories. Dynamic Operating State Variables may comprise: yaw rate; lateral acceleration, front/rear/CG; roll angle and roll rate, inertial and relative to road surface; Throttle position/engine torque; Traction Control status; Speed; Longitudinal acceleration; Wheel speeds; Steer angle and steer torque; Brake pressure, front and rear; ABS status; Suspension displacements and velocities; Clutch position; and/or Wheel side-slip angles. Control Interventions may comprise: Brake applications, front and/or rear; Throttle and/or engine torque output; and/or Steering torques. Driving State Variables may comprise: Speed; Cornering level; Coefficient of friction; Passenger load; and/or Passenger position. Control Tuning Parameters may comprise: Timing of brake interventions; Phasing of front and rear brakes; Intensity of intervention (brake pressure, etc.); and/or Intensity and phasing with respect to error in states (e.g., yaw rate).

Generally, the invention relates to an inventive method of implementing stability control. In on example, the invention elates to a method to stabilize a 2- or more-wheel motorcycle when driving on- or off-highway, said method comprising the steps of: measuring the dynamic operating state of a physical motorcycle as represented by its yaw rate, lateral acceleration, roll angle, throttle position, brake pressures, steer angle, wheel speeds or any other physical parameter indicative of its dynamic state; computing the dynamic response of a high-fidelity computer simulation model in an on-board controller operating at the same speed and steer angle conditions as measured on the physical motorcycle; assessing the stability of the physical motorcycle on a continuing basis by comparing its instantaneous operating state to the computer simulation model indicative of a stable operating state; intervening in the operation of the motorcycle independent of driver actions by one or more of intervention steps, said intervention steps comprising: selective application of front and/or rear brakes; coordinating brake applications with the operation of an anti-lock brake system; modulating the engine torque on the drive wheel(s); coordinating with a traction control system; or applying a torque to the steering system. The method may also include additional steps and features wherein, for example: the instantaneous yaw rate of the motorcycle is compared to that of the computer model and the front and/or rear brakes are applied at a time and intensity synchronized to the difference in the yaw rates such that the difference is reduced; the instantaneous lateral acceleration of the motorcycle is compared to that of the computer model and the front and/or rear brakes are applied at a time and intensity synchronized to the difference in the lateral acceleration such that the difference is reduced; the instantaneous yaw rate of the motorcycle is compared to that of the computer model and the engine torque is modulated at a time and intensity synchronized to the difference in the yaw rates such that the difference is reduced; the instantaneous lateral acceleration of the motorcycle is compared to that of the computer model and the engine torque is modulated at a time and intensity synchronized to the difference in the lateral acceleration such that the difference is reduced; the instantaneous roll angle of the motorcycle is compared to that of the computer model and the front and/or rear brakes are applied at a time and intensity synchronized to the difference in the roll angle such that the difference is reduced; the instantaneous roll angle of the motorcycle is compared to that of the computer model and the engine torque is modulated at a time and intensity synchronized to the difference in the roll angle such that the difference is reduced the instantaneous state of the motorcycle is compared to the computer model for the purpose of estimating the friction coefficient of the road surface in order to adjust the time and intensity of brake and/or engine and/or steering intervention to compensate for differences in friction level; the instantaneous state of the motorcycle is compared to the computer model for the purpose of estimating the tire friction properties in order to adjust the time and intensity of brake and/or engine and/or steering intervention to compensate for differences in the tire properties; and the instantaneous state of the motorcycle is compared to the computer model for the purpose of estimating the weight being carried on the motorcycle in order to adjust the time and intensity of brake and/or engine and/or steering intervention to compensate for differences in the tire properties the instantaneous state of the motorcycle is compared to the computer model for the purpose of estimating the driver position on the motorcycle in order to adjust the time and intensity of brake and/or engine and/or steering intervention to compensate for differences in the tire properties.

Generally as to the foregoing description, motorcycles can become unstable when operating at high speeds and at high cornering levels. For example, they can exhibit an oscillation at the rear wheel commonly known as "weave." A system and method of the invention is provided which utilizes a high-fidelity computer simulation model of a 2- or 3-wheel motorcycle to predict operating states such as yaw rate, lateral acceleration and roll angle for a stable motorcycle at a given speed and steer angle. The operating state of a physical motorcycle can be measured and compared to that of the model at every instant in time to determine if the operating state of the physical motorcycle differs from that of the simulation model in such a way as to indicate loss of stability. The nature of that difference can then be used to intervene in the operation of the motorcycle independent of driver actions by application of brakes, modulating the engine torque or applying torques to urge the steering system in a corrective direction. Thus by comparing the physical response of the motorcycle to that of the computer model in an on-board controller these interventions can be applied at a time and intensity to stabilize the motorcycle and prevent a loss of control.

This method may also be implemented as a stability control system to stabilize a 2- or more-wheel motorcycle wherein the motorcycle including a chassis, steering system, wheels, brakes for said wheels, an engine generating engine torque to generate vehicle speed, a throttle for controlling the vehicle speed and other vehicle components that might optionally be included. The system includes a system controller mountable to a motorcycle, and sensors mountable to the motorcycle which measure a dynamic operating state of the motorcycle including yaw rate, lateral acceleration, roll angle, throttle position, brake pressures, steer angle, wheel speeds or any other physical parameter indicative of the dynamic operating state. The system controller includes a computer simulation controller which computes the dynamic response of a high-fidelity computer simulation model in an on-board controller for the motorcycle operating at the same speed and steer angle conditions as measured on the physical motorcycle, such that said system controller assesses the stability of the physical motorcycle on a continuing basis by comparing its instantaneous operating state to the computer simulation model indicative of a stable operating state. The system controller may intervene in the operation of the motorcycle independent of driver actions by one or more of intervention steps, said intervention steps comprising: selective application of front and/or rear brakes; coordinating brake applications with the operation of an anti-lock brake system; modulating the engine torque on the drive wheel(s); coordinating with a traction control system; or applying a torque to the steering system.

While the detailed description of the invention above shows the stability control system as used for example on circular or curving roads, the stability control system is used on the vehicle when operating under any operating condition in which the stability control system can stabilize weave. Generally, the weave motion occurs not only on circular roads but also on straight roads. Under such an oscillation, the vehicle yaw rate is still predictable even though it is smaller in value. Therefore, the present invention is not limited to circular roads and is also operative on straight roads.

Although particular preferred embodiments of the invention have been disclosed in detail for illustrative purposes, it will be recognized that variations or modifications of the disclosed apparatus, including the rearrangement of parts, lie within the scope of the present invention.

What is claimed:

1. A method for operating an electronic stability control system to stabilize a 2- or more-wheel physical motorcycle operated by a driver when driving on- or off-highway, said method comprising the steps of:
   Measuring an instantaneous dynamic operating state of said physical motorcycle as represented by its yaw rate, lateral acceleration, roll angle, throttle position, brake pressures, steer angle, wheel speeds or any other physical parameter indicative of said instantaneous dynamic operating state;
   Computing the dynamic response of a high-fidelity computer simulation model in an on-board controller operating at the same speed and steer angle conditions as measured on said physical motorcycle;
   Assessing the stability of said physical motorcycle on a continuing basis by comparing said instantaneous dynamic operating state to the computer simulation model indicative of a stable operating state;
   Intervening in the operation of the physical motorcycle independent of driver actions by one or more of intervention steps, said intervention steps comprising:
      Selective application of front and/or rear brakes of said physical motorcycle;
      Coordinating brake applications with the operation of an anti-lock brake system of said physical motorcycle;
      Modulating the engine torque on the drive wheel(s) of said physical motorcycle;
      Coordinating with a traction control system of said physical motorcycle; or
      Applying a torque to a steering system of said physical motorcycle;
   wherein said intervening step is applied by said on-board controller upon detection of a weave oscillation associated with weave by said physical motorcycle which is compared with said computer simulation to identify that said weave oscillation exceeds a threshold requiring application of said intervening step to reduce said weave oscillation.

2. A method of claim 1 wherein said weave oscillation is identified by an instantaneous yaw rate wherein the instantaneous yaw rate of the motorcycle is compared to that of the computer simulation model and the front and/or rear brakes are applied at a time and intensity synchronized to the difference in an actual yaw rate determined by said measuring step and a predicted yaw rate determined by said computer simulation model wherein said brake is applied when a magnitude of said actual yaw rate is less than a magnitude of said predicted yaw rate such that the difference is reduced when said actual yaw rate exceeds said predicted yaw rate.

3. A method of claim 1 wherein said motorcycle oscillation is identified by an instantaneous lateral acceleration wherein the instantaneous lateral acceleration of the motorcycle is compared to that of the computer simulation model and the front and/or rear brakes are applied at a time and intensity synchronized to the difference in the lateral acceleration such that the difference is reduced.

4. A method of claim 1 wherein said weave oscillation is identified by an instantaneous yaw rate wherein the instantaneous yaw rate of the motorcycle is compared to that of the computer simulation model and the engine torque is modulated at a time and intensity synchronized to the difference in an actual vaw rate determined by said measuring step and a predicted yaw rate determined by said computer simulation model such that the difference is reduced when said actual yaw rate exceeds said predicted yaw rate.

5. A method of claim 1 wherein said weave oscillation is identified by an instantaneous lateral acceleration wherein the instantaneous lateral acceleration of the motorcycle is compared to that of the computer simulation model and the engine torque is modulated at a time and intensity synchronized to the difference in the lateral acceleration such that the difference is reduced.

6. A method of claim 1 wherein said weave oscillation is identified by an instantaneous roll angle wherein the instantaneous roll angle of the motorcycle is compared to that of the computer simulation model and the front and/or rear brakes are applied at a time and intensity synchronized to the difference in the roll angle such that the difference is reduced.

7. A method of claim 1 wherein said motorcycle oscillation is identified by an instantaneous roll angle wherein the instantaneous roll angle of the motorcycle is compared to that of the computer simulation model and the engine torque is modulated at a time and intensity synchronized to the difference in the roll angle such that the difference is reduced.

8. A method of claim 1 wherein the instantaneous dynamic operating state of the motorcycle is compared to the computer simulation model for the purpose of estimating the friction coefficient of the road surface in order to adjust the time and intensity of brake and/or engine and/or steering intervention to compensate for differences in friction level.

9. A method of claim 1 wherein the instantaneous dynamic operating state of the motorcycle is compared to the computer simulation model for the purpose of estimating the tire friction properties in order to adjust the time and intensity of brake and/or engine and/or steering intervention to compensate for differences in the tire properties.

10. A method of claim 1 wherein the instantaneous dynamic operating state of the motorcycle is compared to the computer simulation model for the purpose of estimating the weight being carried on the motorcycle in order to adjust the time and intensity of brake and/or engine and/or steering intervention to compensate for differences in the tire loads.

11. A method of claim 1 wherein the instantaneous dynamic operating state of the motorcycle is compared to the computer simulation model for the purpose of estimating the driver position on the motorcycle in order to adjust the time and intensity of brake and/or engine and/or steering intervention to compensate for differences in the tire loads.

12. A stability control system to stabilize a 2- or more-wheel motorcycle, said system comprising:
said motorcycle including a chassis, steering system, wheels, brakes for said wheels, an engine generating engine torque to generate vehicle speed, a throttle for controlling the vehicle speed;
a system controller mountable to a motorcycle;
sensors mountable to the motorcycle which measure a dynamic operating state of the motorcycle including yaw rate, lateral acceleration, roll angle, throttle position, brake pressures, steer angle, wheel speeds or any other physical parameter indicative of the dynamic operating state;
said system controller including a computer simulation controller which computes the dynamic response of a high-fidelity computer simulation model in an on-board controller for the motorcycle operating at the same speed and steer angle conditions as measured on the physical motorcycle;
said system controller assessing the stability of the physical motorcycle on a continuing basis by comparing said dynamic operating state to the computer simulation model indicative of a stable operating state;
said system controller intervening in the operation of the motorcycle independent of driver actions by one or more of intervention steps, said intervention steps comprising:
selective application of front and/or rear brakes of said motorcycle;
coordinating brake applications with the operation of an anti-lock brake system of said motorcycle;
modulating the engine torque on the drive wheel(s) of said motorcycle;
coordinating with a traction control system of said motorcycle; or
applying a torque to the steering system;
wherein said intervening step is applied by said on-board controller upon detection of a weave oscillation associated with weave by said physical motorcycle which is compared with said computer simulation to identify that said weave oscillation exceeds a threshold requiring application of said intervening step to reduce said weave oscillation.

13. A stability control system according to claim 12 wherein an instantaneous yaw rate of the motorcycle is compared to that of the computer simulation model and the front and/or rear brakes are applied at a time and intensity synchronized to the difference in an actual yaw rate determined by said measuring step and a predicted yaw rate determined by said computer simulation model wherein said brake is applied when a magnitude of said actual yaw rate is less than a magnitude of said predicted yaw rate such that the difference is reduced.

14. A stability control system according to claim 12 wherein an instantaneous lateral acceleration of the motorcycle is compared to that of the computer simulation model and the front and/or rear brakes are applied at a time and intensity synchronized to the difference in the lateral acceleration such that the difference is reduced.

15. A stability control system according to claim 12 wherein an instantaneous yaw rate of the motorcycle is compared to that of the computer simulation model and the engine torque is modulated at a time and intensity synchronized to the difference in an actual yaw rate determined by said measuring step and a predicted yaw rate determined by said computer simulation model such that the difference is reduced.

16. A stability control system according to claim 12 wherein an instantaneous lateral acceleration of the motorcycle is compared to that of the computer simulation model and the engine torque is modulated at a time and intensity synchronized to the difference in the lateral acceleration such that the difference is reduced.

17. A stability control system according to claim 12 wherein an instantaneous roll angle of the motorcycle is compared to that of the computer simulation model and the front and/or rear brakes are applied at a time and intensity synchronized to the difference in the roll angle such that the difference is reduced.

18. A stability control system according to claim 12 wherein an instantaneous roll angle of the motorcycle is compared to that of the computer simulation model and the engine torque is modulated at a time and intensity synchronized to the difference in the roll angle such that the difference is reduced.

19. A stability control system according to claim 12 wherein an instantaneous state of the motorcycle is compared to the computer simulation model for the purpose of estimating the friction coefficient of the road surface in order to adjust the time and intensity of brake and/or engine and/or steering intervention to compensate for differences in friction level.

20. A stability control system according to claim 12 wherein an instantaneous state of the motorcycle is compared to the computer simulation model for the purpose of estimating the tire friction properties in order to adjust the time and intensity of brake and/or engine and/or steering intervention to compensate for differences in the tire properties.

21. A stability control system according to claim 12 wherein an instantaneous state of the motorcycle is compared to the computer simulation model for the purpose of estimating the weight being carried on the motorcycle in order to adjust the time and intensity of brake and/or engine and/or steering intervention to compensate for differences in the tire loads.

22. A stability control system according to claim 12 wherein an instantaneous state of the motorcycle is compared to the computer simulation model for the purpose of estimating the driver position on the motorcycle in order to adjust the time and intensity of brake and/or engine and/or steering intervention to compensate for differences in the tire loads.

23. A stability control system to stabilize a motorcycle having at least two wheels, said system comprising:
   said motorcycle including a chassis, steering system, wheels, brakes for said wheels, an engine generating engine torque to generate vehicle speed, a throttle for controlling the vehicle speed;
   a system controller mountable to a motorcycle;
   sensors mountable to the motorcycle which measure a dynamic operating state of said motorcycle defined by one or more physical parameters of said dynamic operating state including yaw rate, lateral acceleration, roll angle, throttle position, brake pressures, steer angle, and wheel speeds;
   said system controller including a computer simulation controller which computes the dynamic response of a high-fidelity computer simulation model in an on-board controller for the motorcycle operating at the same conditions as measured on said motorcycle;
   said system controller assessing the stability of the motorcycle on a continuing basis by comparing said dynamic operating state to the computer simulation model indicative of a stable operating state;
   said system controller intervening in the operation of the motorcycle independent of driver actions by one or more of intervention steps, said intervention steps comprising:
      selective application of front and/or rear brakes of said motorcycle;
      coordinating brake applications with the operation of an anti-lock brake system of said motorcycle;
      modulating the engine torque on the drive wheel(s) of said motorcycle;
      coordinating with a traction control system of said motorcycle; or
      applying a torque to the steering system; and
   wherein said intervening step is applied by said on-board controller upon detection of a cyclic weave oscillation associated with weave by said motorcycle which is compared with said computer simulation to identify that said weave oscillation defines an amplitude of an actual yaw rate which is periodically greater than an amplitude of a predicted yaw rate determined by said computer simulation model, wherein said selective application of said front and/or rear brakes is performed when a magnitude of said actual yaw rate is smaller than a magnitude of said predicted yaw rate and is not performed when the magnitude of said actual yaw rate is larger than the magnitude of said predicted yaw rate.

* * * * *